Figure 1:
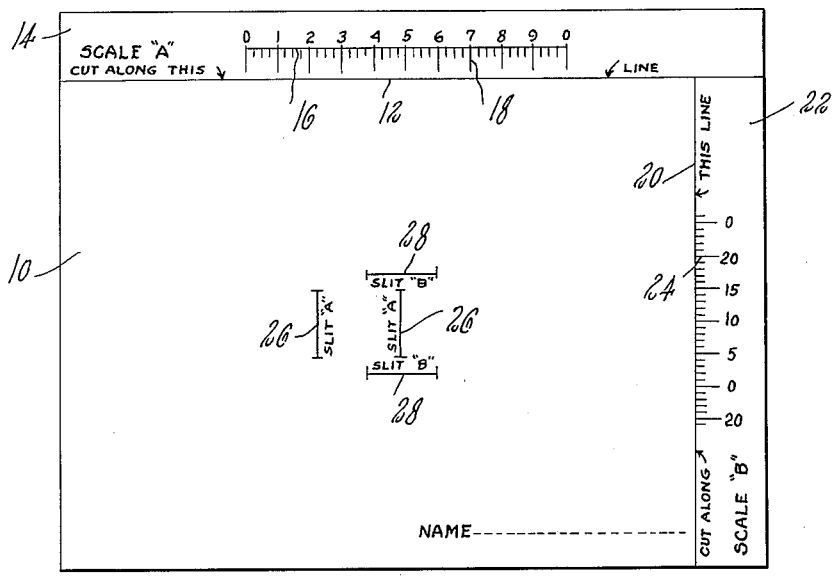

April 21, 1953  L. G. DRURY  2,635,356

EDUCATIONAL DEVICE FOR READING MICROMETERS

Filed Aug. 29, 1950

Inventor
Lawrence G. Drury
by Wright, Brown, Quinby may
Attys.

Patented Apr. 21, 1953

2,635,356

UNITED STATES PATENT OFFICE 2,635,356

EDUCATIONAL DEVICE FOR READING MICROMETERS

Lawrence G. Drury, Newton, Mass.

Application August 29, 1950, Serial No. 182,014

1 Claim. (Cl. 35—39)

This invention relates to an educational device for facilitating instruction in the reading of micrometers. The ordinary micrometer includes a stationary barrel through which is threaded a spindle having a tubular thimble on the end thereof, the forward portion of which overlaps a portion of the barrel. A series of scale divisions is arranged longitudinally on the barrel to cooperate with the edge of the thimble to indicate the spacing between the feeler tips, the distance between each pair of consecutive scale divisions being equal to the distance advanced by the spindle and thimble when they make one full turn, this distance being customarily $\frac{1}{40}$ of an inch. The edge of the thimble is also customarily provided with scale marks, the periphery being divided up into a predetermined number of equal parts, each part representing a specified fraction of the distance advanced by the thimble in making one full turn. The barrel is provided with a longitudinal line which serves as an index against which the scale on the thimble is read. These scale divisions are small on the actual instrument and therefore comparatively difficult to read. According to the present invention, movable scales are provided to simulate portions of the scales found on the ordinary micrometer, the scales being greatly magnified to facilitate reading. It is a further object of the invention to provide a device of this kind which is very inexpensive and which can easily be assembled by the student.

For a more complete understanding of the invention, reference may be had to the following description thereof and to the drawing, of which—

Figure 2:
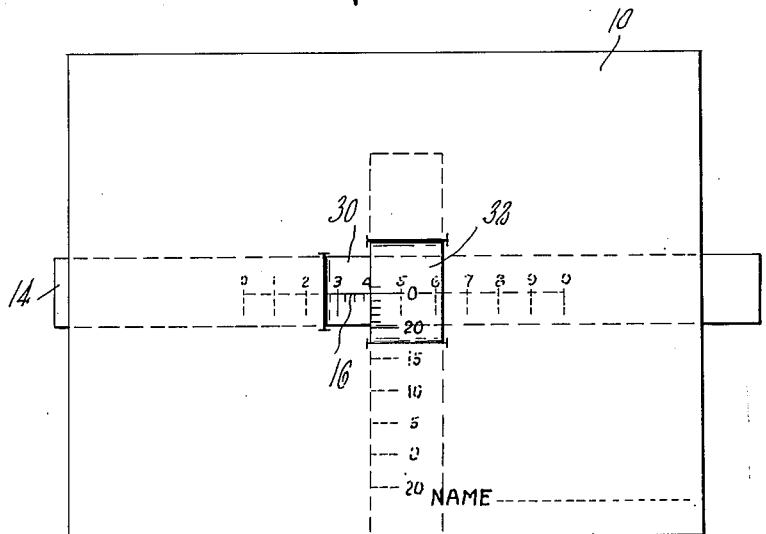

Figure 1 is a plan view of a sheet adapted to be cut up as directed and the parts assembled to form an educational device embodying the invention; and Figure 2 is a plan view of the assembled device.

The invention may be embodied in a rectangular sheet 10 having a line of cut 12 ruled parallel to and spaced from an edge of the sheet. The line 12 thus indicates a strip 14 which is to be cut from the sheet. On the strip 14 is ruled a median line 16 which extends for a considerable portion of the length of the strip. A number of equally spaced scale marks 18 on the strip 14 intersect the median 16.

A second line of cut 20 is ruled parallel to another edge of the sheet 10 to define a second strip 22 which may be of substantially the same width of the strip 14. A series of scale marks 24 are provided on the strip 22 along an edge thereof.

In the body of the sheet 10, preferably in the midportion thereof, two pairs of short parallel lines are provided to indicate where slits are to be made through the sheet. The lines of one such pair 26 are spaced apart a distance about equal to the width of the strip 14, the length of each line being slightly greater than the width of the strip 14. The other two parallel lines 28 extend in a direction perpendicular to the direction of the lines 26. The lines 28 are spaced apart a distance somewhat greater than the width of the strip 14, the length of each line being slightly greater than the width of the strip 22. The lines 26 are located with reference to the lines 28 so that one of the former is between the latter as shown in Figure 1.

The sheet 10 shown in Figure 1 is cut along the lines 12 and 20 to sever the strips 14 and 22 from the sheet. After the slits are cut on the lines 26 and 28, the strip 14 is threaded through the slits 26 in such a way that the portion 30 of the strip 14 between the slits is exposed on the upper face of the sheet. The strip 20 is threaded through the slits 28 in such a way that the portion 32 of this strip which is between the slits overlies a part of the portion 30 of the strip 14 and a part of the upper face of the sheet 10 as indicated in Figure 2. The exposed portion 30 of the strip 14 thus represents a magnified portion of the barrel of the micrometer. The exposed portion 32 of the strip 22 represents a magnified portion of the thimble of the micrometer. The scale markings on the strip 22 are read against the median line 16 of the strip 14 so that the strips 14 and 22 can be set to indicate any desired micrometer readings. These readings can conveniently be inspected by the instructor without the use of magnifying means.

I claim:

An educational device comprising a sheet having two pairs of parallel spaced slits of equal length therein, the slits of one pair having a direction at right angles to the direction of the slits of the other pair, one of the slits of the first said pair being located between the slits of the second pair, a strip threaded through the first said pair of slits so that only the portion between the slits is superposed upon on the upper face of the sheet, a second strip threaded through the second pair of slits so that only the portion between the slits is exposed, said portion overlying part of the superposed portion of the first strip, and scale marks on said strips.

LAWRENCE G. DRURY.

References Cited in the file of this patent

UNITED STATES PATENTS

| Number | Name | Date |
|---|---|---|
| 832,871 | Mitchell | Oct. 9, 1906 |
| 1,028,378 | Newman | June 4, 1912 |
| 1,696,987 | Troidl | Jan. 1, 1929 |
| 1,867,888 | Obidine | July 19, 1932 |
| 2,347,561 | Howard | Apr. 25, 1945 |